United States Patent
Oshimo et al.

(10) Patent No.: US 10,435,546 B2
(45) Date of Patent: Oct. 8, 2019

(54) PNEUMATIC TIRE

(71) Applicant: SUMITOMO RUBBER INDUSTRIES, LTD., Kobe-shi, Hyogo (JP)

(72) Inventors: Masaki Oshimo, Kobe (JP); Toshifumi Haba, Kobe (JP); Takahiro Mabuchi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 83 days.

(21) Appl. No.: 15/756,844

(22) PCT Filed: Aug. 17, 2016

(86) PCT No.: PCT/JP2016/074005
§ 371 (c)(1),
(2) Date: Mar. 1, 2018

(87) PCT Pub. No.: WO2017/056767
PCT Pub. Date: Apr. 6, 2017

(65) Prior Publication Data
US 2018/0258262 A1   Sep. 13, 2018

(30) Foreign Application Priority Data

Sep. 30, 2015 (JP) ................................. 2015-194692
Sep. 30, 2015 (JP) ................................. 2015-194693
Sep. 30, 2015 (JP) ................................. 2015-194694

(51) Int. Cl.
C08L 9/06 (2006.01)
B60C 1/00 (2006.01)
C08F 4/70 (2006.01)
C08F 36/06 (2006.01)
C08F 136/06 (2006.01)
C08K 3/36 (2006.01)
C08L 7/00 (2006.01)
C08L 9/00 (2006.01)

(52) U.S. Cl.
CPC .................. C08L 9/06 (2013.01); B60C 1/00 (2013.01); B60C 1/0016 (2013.01); B60C 1/0025 (2013.01); C08F 4/70 (2013.01); C08F 36/06 (2013.01); C08F 136/06 (2013.01); C08K 3/36 (2013.01); C08L 7/00 (2013.01); C08L 9/00 (2013.01); C08L 2205/025 (2013.01)

(58) Field of Classification Search
CPC ...... C08L 9/06; C08L 7/00; C08L 9/00; C08L 2205/025; B60C 1/00; B60C 1/0016; B60C 1/0025; C08F 4/70; C08F 36/06; C08F 136/06; C08K 3/36
USPC ..................................................... 526/493
See application file for complete search history.

(56) References Cited

U.S. PATENT DOCUMENTS

| 5,852,099 A | 12/1998 | Vanel |
| 2002/0143096 A1 | 10/2002 | Amaddeo et al. |
| 2008/0161461 A1 | 7/2008 | Cruse et al. |
| 2009/0176910 A1 | 7/2009 | Anbe et al. |
| 2011/0269899 A1 | 11/2011 | Murakami et al. |
| 2017/0107358 A1 | 4/2017 | Ambe et al. |

FOREIGN PATENT DOCUMENTS

| EP | 3106479 A1 | 12/2016 |
| EP | 3106491 A1 | 12/2016 |
| JP | 05-194658 A | 8/1993 |
| JP | 08-277346 A | 10/1996 |
| JP | 2002-338742 A | 11/2002 |
| JP | 2003-500280 A | 1/2003 |
| JP | 2004-211048 A | 7/2004 |
| JP | 2004-339467 A | 12/2004 |
| JP | 2005-008817 A | 1/2005 |
| JP | 2005-154754 A | 6/2005 |
| JP | 2005-298612 A | * 10/2005 |
| JP | 2005-298612 A | 10/2005 |
| JP | 2006-241265 A | 9/2006 |
| JP | 2008-101127 A | 5/2008 |
| JP | 2010-514897 A | 5/2010 |
| JP | 2010-163590 A | 7/2010 |
| JP | 2011-079954 A | 4/2011 |

(Continued)

OTHER PUBLICATIONS

International Search Report for PCT/JP2016/074005 (PCT/ISA/210) dated Nov. 1, 2016.
Written Opinion of the International Searching Authority for PCT/JP2016/074005 (PCT/ISA/237) dated Nov. 1, 2016.
International Preliminary Report on Patentability and the English translation of the Written Opinion of the International Searching Authority (Forms PCT/IB/338, PCT/IB/373 and PCT/ISA/237), dated Apr. 12, 2018, for International Application No. PCT/JP2016/074005.
Extended European Search Report for European Application No. 16850943.8, dated Apr. 8, 2019.

*Primary Examiner* — William K Cheung
(74) *Attorney, Agent, or Firm* — Birch, Stewart, Kolasch & Birch LLP

(57) ABSTRACT

A pneumatic tire having a tire component prepared by use of a rubber composition according to the present invention which comprises: a polybitadiene (i) which satisfies conditions of (A) a Mooney viscosity ($ML_{1+4,\ 100°\ C.}$) of 43 to 70, (B) a ratio ($Tcp/ML_{1+4,\ 100°\ C.}$) of 5% by mass toluene solution viscosity (Tcp) to Mooney viscosity ($ML_{1+4,\ 100°\ C.}$) of 0.9 to 1.7, (C) a stress relaxation time (T80), being a time until a torque is attenuated by 80% assuming that the torque at the end of $ML_{1+4,\ 100°\ C.}$ measurement is 100%, of 10.0 to 40.0 seconds, (D) a molecular weight distribution (Mw/Mn) of 2.50 to 4.00, and (F) a proportion of cis-structure in microstructural analysis of not more than 98 mol %; another rubber (ii); and a rubber reinforcing material (iii), is excellent in processability and properties of tire.

14 Claims, No Drawings

(56) References Cited

FOREIGN PATENT DOCUMENTS

| | | |
|---|---|---|
| JP | 2013-122021 A | 6/2013 |
| JP | 2014-185340 A | 10/2014 |
| WO | WO 00/73092 A1 | 12/2000 |
| WO | WO 2007/081018 A1 | 7/2007 |
| WO | WO 2008/085454 A1 | 7/2008 |
| WO | WO 2015/151626 A1 | 10/2015 |

* cited by examiner

PNEUMATIC TIRE

This application is a U.S. National Stage Application under 35 U.S.C. § 371 of PCT International Application No. PCT/JP2016/074005 filed Aug. 17, 2016, which claims the priority benefit of Japan Patent Application No. 2015-194692, filed on Sep. 30, 2015, Japan Patent Application No. 2015-194693, filed on Sep. 30, 2015, and Japan Patent Application No. 2015-194694, filed on Sep. 30, 2015 in the Japan Patent Office, the disclosures of which are incorporated herein in their entirety by reference.

TECHNICAL FIELD

The present invention relates to a pneumatic tire having a tire component prepared by use of a rubber composition for tire comprising a specific polybutadiene.

BACKGROUND ART

Polybutadiene is generally superior to other rubbers in its fuel efficiency but is inferior in its processability. However, since fuel efficiency and processability are in a conflicting relation and when one of them is intended to be improved the other performance deteriorates, various improvements have been made.

For example, there has been reported a polybutadiene composition for tire in which both fuel efficiency and processability are improved by specifying a ratio (Tcp/ML) of 5% toluene solution viscosity (Tcp) to a Mooney viscosity (ML) of a polybutadiene synthesized by using a cobalt catalyst (Patent Document 1).

Further, an attempt of further improving both fuel efficiency and processability by specifying, in addition to a ratio (Tcp/ML) of 5% toluene solution viscosity (Tcp) to a Mooney viscosity (ML) of a polybutadiene synthesized by using a cobalt catalyst, a velocity dependence index (n-value) of the Mooney viscosity has been made (Patent Documents 2 and 3).

Rubber compositions comprising carbon black in addition to a rubber component that is obtained by blending a natural rubber which exhibits excellent tensile strength and tear strength, a butadiene rubber which improves flex crack growth resistance and the like have been conventionally used for sidewalls of tires, but in recent years, an attempt of reducing the amount of rubbers in sidewalls has been promoted in order to lighten tires and further improvements of durability of tires such as tensile strength, tensile elongation, tear strength and flex crack growth resistance of sidewalls are required.

In rubber compositions used for a clinch of a tire, a butadiene rubber has been blended for improving flex crack resistance in addition to a natural rubber exhibiting excellent tear strength, and further carbon black has been used for improving weather resistance and a reinforcing property. Also, fuel consumption has been reduced by reducing rolling resistance of tires. The further reduction in fuel consumption has been more and more strongly required, so that not only a rubber composition for tread but also a rubber composition for clinch are required to have excellent fuel efficiency.

As a method for satisfying fuel efficiency of a rubber composition, a method of reducing a content of fillers such as carbon black, silica and the like is known. However, in this case, there is a problem that the strength of rubber composition decreases and abrasion resistance deteriorates.

Patent Document 4 discloses a rubber composition which can improve fuel efficiency by compounding silica with different particle diameters. However, with respect to improvement of low heat build-up property, there is still room for improvement.

PRIOR ART DOCUMENT

Patent Document

Patent Document 1: JP 2004-339467 A
Patent Document 2: JP 2004-211048 A
Patent Document 3: WO 2007/081018 A1
Patent Document 4: JP 2008-101127 A

SUMMARY OF THE INVENTION

Problem to be Solved by the Invention

In the market, a pneumatic tire having a tire component prepared by use of a rubber composition which is more highly excellent in processability and various properties of tire (fuel efficiency, durability, breaking resistance, abrasion resistance and the like) is required.

In the light of the above, an object of the present invention is to provide a pneumatic tire having a tire component prepared by use of a rubber composition which is excellent in processability and properties of tire.

Means to Solve the Problem

Namely, the present invention relates to:
[1] a pneumatic tire having a tire component prepared by use of a rubber composition comprising:
a polybitadiene (i) which satisfies conditions of
(A) a Mooney viscosity ($ML_{1+4,\ 100°\ C.}$) of 43 to 70,
(B) a ratio ($Tcp/ML_{1+4,\ 100°\ C.}$) of 5% by mass toluene solution viscosity (Tcp) to Mooney viscosity ($ML_{1+4,\ 100°\ C.}$) of 0.9 to 1.7,
(C) a stress relaxation time (T80), being a time until a torque is attenuated by 80% assuming that the torque at the end of $ML_{1+4,\ 100°\ C.}$ measurement is 100%, of 10.0 to 40.0 seconds,
(D) a molecular weight distribution (Mw/Mn) of 2.50 to 4.00, and
(F) a proportion of cis-structure in microstructural analysis of not more than 98 mol %,
another rubber (ii) and
a rubber reinforcing material (iii),
[2] the pneumatic tire of the above [1], wherein the polybutadiene (i) further satisfies a condition of
(E) a weight average molecular weight (Mw) of $40.0 \times 10^4$ to $75.0 \times 10^4$,
[3] the pneumatic tire of the above [1] or [2] wherein the polybutadiene (i) is produced by using a cobalt catalyst,
[4] the pneumatic tire of any one of the above [1] to [3], wherein the other rubber (ii) comprises a natural rubber or an isoprene rubber,
[5] the pneumatic tire of any one of the above [1] to [4], wherein the other rubber (ii) comprises a styrene-butadiene rubber,
[6] the pneumatic tire of the above [5], wherein a styrene content of the styrene-butadiene rubber is not less than 30% by mass,
[7] the pneumatic tire of any one of the above [1] to [6], wherein the tire component is a base tread component,

[8] the pneumatic tire of the above [7], wherein a content of the rubber reinforcing material (iii) is 1 to 100 parts by mass based on 100 parts by mass of the rubber component (i)+(ii) which consists of 5 to 90 parts by mass of the polybutadiene (i) and 95 to 10 parts by mass of the other rubber (ii),

[9] the pneumatic tire of any one of the above [1] to [6], wherein the tire component is a sidewall component,

[10] the pneumatic tire of any one of the above [1] to [6], wherein the tire component is a tread component,

[11] the pneumatic tire of the above [9] or [10], wherein a content of the rubber reinforcing material (iii) is 1 to 130 parts by mass based on 100 parts by mass of the rubber component (i)+(ii) which consists of 5 to 90 parts by mass of the polybutadiene (i) and 95 to 10 parts by mass of the other rubber (ii),

[12] the pneumatic tire of any one of the above [1] to [6], wherein the tire component is a clinch and the rubber reinforcing material (iii) comprises silica having a CTAB specific surface area of not less than 180 $m^2/g$ and a BET specific surface area of not less than 185 $m^2/g$, and

[13] the pneumatic tire of the above [12], wherein a content of the silica is 1 to 150 parts by mass based on 100 parts by mass of the rubber component (i)+(ii) which consists of 5 to 90 parts by mass of the polybutadiene (i) and 95 to 10 parts by mass of the other rubber (ii).

Effects of the Invention

According to the present invention, a pneumatic tire having a tire component prepared by use of a rubber composition which is excellent in processability and properties of tire can be provided.

EMBODIMENT FOR CARRYING OUT THE INVENTION

Polybutadiene

The polybutadiene used in the present invention has the following properties.

(A) The Mooney viscosity ($ML_{1+4,\ 100^\circ\ C.}$) is 43 to 70. The Mooney viscosity ($ML_{1+4,\ 100^\circ\ C.}$) is more preferably 48 to 70, further preferably 50 to 65. If the Mooney viscosity ($ML_{1+4,\ 100^\circ\ C.}$) is less than 43, abrasion resistance tends to deteriorate. On the other hand, if the Mooney viscosity ($ML_{1+4,\ 100^\circ\ C.}$) exceeds 70, processability tends to deteriorate.

(B) The ratio ($Tcp/ML_{1+4,\ 100^\circ\ C.}$) of 5% by mass toluene solution viscosity (Tcp) to Mooney viscosity ($ML_{1+4,\ 100^\circ\ C.}$) is 0.9 to 1.7. The $Tcp/ML_{1+4,\ 100^\circ\ C.}$ is preferably 1.2 to 1.7, more preferably 1.4 to 1.7. The $Tcp/ML_{1+4,\ 100^\circ\ C.}$ provides an indication of the branching degree and in the case where the $Tcp/ML_{1+4,\ 100^\circ\ C.}$ is less than 0.9, the branching degree is too high and abrasion resistance deteriorates. On the other hand, in the case where the $Tcp/ML_{1+4,\ 100^\circ\ C.}$ is more than 2.3, the branching degree is too low and a cold flow is easily generated, and the preservation stability of the product is decreased. It is noted that the 5% by mass toluene solution viscosity (Tcp) and the Mooney viscosity ($ML_{1+4,\ 100^\circ\ C.}$) are measured by a method described in Examples as mentioned below.

(C) The stress relaxation time (T80) is 10.0 to 40.0 seconds, which is a time until a torque is attenuated by 80% assuming that the torque at the end of $ML_{1+4,\ 100^\circ\ C.}$ measurement is 100%. The T80 is preferably 11.0 to 26.0 seconds, more preferably 12.0 to 20.0 seconds. When the T80 is less than 10.0 seconds, the state in which fillers are suitably dispersed is hard to obtain because the holding force of shear stress are insufficient due to insufficient entanglement of rubber molecules. On the other hand, when the T80 is more than 40.0 seconds, the dimension stability is inferior and processability deteriorates because a residual stress in a molding process is increased. It is noted that the stress relaxation time (T80) is measured by a method described in the production examples as mentioned below. The change of the stress relaxation of a rubber depends on a combination of an elastic ingredient with a viscosity ingredient, and slow stress relaxation shows much elastic ingredient while fast stress relaxation shows much viscosity ingredient.

(D) The molecular weight distribution (Mw/Mn) is 2.50 to 4.00. The Mw/Mn is preferably 2.60 to 3.60, more preferably 2.70 to 3.20. When the Mw/Mn is less than 2.50, processability deteriorates. On the other hand, when the Mw/Mn is more than 4.00, abrasion resistance deteriorates. It is noted that the number average molecular weight (Mn), the weight average molecular weight (Mw) and the molecular weight distribution (Mw/Mn) are measured by a method described in Examples as mentioned below.

Further, in the polybutadiene used in the present invention, (E) the weight average molecular weight (Mw) is preferably $40.0 \times 10^4$ to $75.0 \times 10^4$, more preferably $46.0 \times 10^4$ to $65.0 \times 10^4$, further preferably $52.0 \times 10^4$ to $62.0 \times 10^4$. When the Mw is not less than $40.0 \times 10^4$, abrasion resistance more improves. On the other hand, when the Mw is not more than $75.0 \times 10^4$, processability more improves.

Further, in the polybutadiene used in the present invention, (F) the proportion of cis-structure in microstructural analysis is preferably not more than 98 mol %, more preferably 94.0 to 97.8 mol %, further preferably 95.0 to 97.6 mol %. When the proportion of cis-structure in microstructural analysis is not more than 98 mol %, sufficient branched polymer chains are provided and a stress relaxation time to be required is easily obtained. However, when the proportion of cis-structure in microstructural analysis is too small, abrasion resistance tends to deteriorate. It is noted that the proportion of the microstructure is measured by a method described in Examples as mentioned below.

In the polybutadiene used in the present invention, the toluene solution viscosity (Tcp) is preferably 42 to 160, more preferably 55 to 135, further preferably 68 to 120. When the Tcp is not less than 42, abrasion resistance more improves. On the other hand, when the Tcp is not more than 160, processability more improves.

In the polybutadiene used in the present invention, the number average molecular weight (Mn) is preferably $12.5 \times 10^4$ to $30.0 \times 10^4$, more preferably $16.0 \times 10^4$ to $23.0 \times 10^4$, further preferably $17.0 \times 10^4$ to $20.3 \times 10^4$. When the Mn is not less than $12.5 \times 10^4$, abrasion resistance more improves. On the other hand, when the Mn is not more than $30.0 \times 10^4$, processability more improves.

In the polybutadiene used in the present invention, the proportion of vinyl-structure in microstructural analysis is preferably not more than 2 mol %, more preferably not more than 1.8 mol %. When the proportion of vinyl-structure in microstructural analysis is not more than 2 mol %, the molecular mobility is good and the tan δ in dynamic viscoelasticity property after vulcanization is good. It is noted that the proportion of vinyl-structure in microstructural analysis is preferably as low as possible, but the proportion may be not less than 1.0 mol %, for example.

In the polybutadiene used in the present invention, the proportion of trans-structure in microstructural analysis is preferably not more than 2.0 mol %, more preferably not more than 1.6 mol %, further preferably not more than 1.3 mol %. When the proportion of trans-structure in microstructural analysis is not more than 2.0 mol %, abrasion resistance more improves. It is noted that the proportion of trans-structure in microstructural analysis is preferably as low as possible, but the proportion may be not less than 1.0 mol %, for example.

In the polybutadiene used in the present invention, the polybutadiene may be modified with disulfur dichloride, monosulfur monochloride, other sulfur compounds, an organic peroxide, t-butyl chloride and the like and the polybutadiene may be not modified.

Production Method of Polybutadiene

The polybutadiene used in the present invention can be produced by using a catalyst system consisting of a transition metal catalyst, an organic aluminum compound and water.

As the transition metal catalyst, a cobalt catalyst is suitable. Examples of the cobalt catalyst include: cobalt salts such as cobalt chloride, cobalt bromide, cobalt nitrate, cobalt octylate (ethyl hexanoate), cobalt naphthenate, cobalt acetate and cobalt malonate; cobalt bis-acetylacetonate, cobalt tris-acetylacetonate, acetoacetic acid ethyl ester cobalt, and organic base complexes or ethyl alcohol complexes of cobalt salts such as pyridine complexes and picoline complexes. Among these, cobalt octylate (ethyl hexanoate) is preferable. It is noted that, if a polybutadiene having the above-mentioned properties is obtained, other catalysts such as a neodymium catalyst or a nickel catalyst can be used.

The amount of the transition metal catalyst to be used can be adjusted appropriately such that a polybutadiene has a desired Mooney viscosity.

Examples of the organic aluminum compound include: trialkylaluminum; halogen containing organic aluminum compounds such as dialkylaluminum chloride, dialkylaluminum bromide, alkylaluminum sesquichloride, alkylaluminum sesquibromide, alkylaluminum dichloride and alkylaluminum dibromide; hydrogenated organic aluminum compounds such as dialkylaluminum hydride, alkylaluminum sesquihydride and the like. The organic aluminum compound may be used alone or may be used in combination with two or more thereof.

Specific examples of the trialkylaluminum include trimethylaluminum, triethylaluminum, triisobutylaluminum, trihexylaluminum, trioctylaluminum, tridecylaluminum and the like.

Examples of the dialkylaluminum chloride include dimethylaluminum chloride, diethylaluminium chloride and the like. Examples of the dialkylaluminum bromide include dimethylaluminum bromide, diethylaluminium bromide and the like. Examples of the alkylaluminum sesquichloride include methylaluminum sesquichloride, ethylaluminum sesquichloride and the like. Examples of the alkylaluminum sesquibromide include methylaluminum sesquibromide, ethylaluminum sesquibromide and the like. Examples of the alkylaluminum dichloride include methylaluminum dichloride, ethylaluminum dichloride and the like. Examples of the alkylaluminum dibromide include methylaluminum dibromide, ethylaluminum dibromide and the like.

Examples of the dialkylaluminum hydride include diethylaluminium hydride, diisobutylaluminum hydride and the like. Examples of the alkylaluminum sesquihydride include ethylaluminum sesquihydride, isobutylaluminum sesquihydride and the like.

As for the mixing ratio of the organic aluminum compound and water, the ratio of aluminum/water (mole ratio) is preferably 1.5 to 3, more preferably 1.7 to 2.5 because a polybutadiene having a desired T80 is easily obtained.

Further, in order to obtain a polybutadiene having a desired Mooney viscosity, a molecular weight modifier such as non-conjugated dienes such as cyclooctadiene, allene, methylallene (1,2-butadiene) and the like; α-olefins such as ethylene, propylene, 1-butene and the like can be used. The molecular weight modifier may be used alone or may be used in combination with two or more thereof.

The polymerization method is not limited particularly, and a mass polymerization (bulk polymerization) for polymerizing a monomer where a conjugated diene compound monomer such as 1,3-butadiene is used as a polymerization solvent, or a solution polymerization for polymerizing a monomer in a condition where the monomer is soluble in a solvent can be applied. Examples of the solvent used for the solution polymerization include: aromatic-type hydrocarbons such as toluene, benzene, xylene and the like; saturated aliphatic hydrocarbons such as n-hexane, butane, heptane, pentane and the like; alicyclic hydrocarbons such as cyclopentane, cyclohexane and the like; olefin-type hydrocarbons such as cis-2-butene, trans-2-butene and the like; petroleum-type solvents such as mineral spirits, solvent naphtha, kerosene and the like; and halogenated hydrocarbons such as methylene chloride and the like. Among these, toluene, cyclohexane, or a mixed solvent of cis-2-butene and trans-2-butene is preferably used.

The polymerization temperature is preferably in a range of −30 to 150° C., more preferably in a range of 30 to 100° C., further preferably in a range of 70 to 80° C. because a polybutadiene having a desired T80 is easily obtained. The polymerization time is preferably in a range of 1 minute to 12 hours, more preferably in a range of 5 minutes to 5 hours.

After the polymerization reaction reaches a specified polymerization rate, an anti-aging agent can be added as needed. Examples of the anti-aging agent include: phenol anti-aging agents such as 2,6-di-t-butyl-p-cresol (BHT) and the like; phosphorus anti-aging agents such as trinonyl phenyl phosphite (TNP) and the like; and sulfur anti-aging agents such as 4,6-bis(octyl thiomethyl)-o-cresol, dilauryl-3,3'-thiodipropionate (TPL) and the like. The anti-aging agent may be used alone or may be used in combination with two or more thereof. The added amount of the anti-aging agent is preferably 0.001 to 5 parts by mass based on 100 parts by mass of the polybutadiene.

After polymerization for a specified time, the pressure inside a polymerization tank is discharged as needed, and a post-process such as washing or drying step is further performed, whereby a polybutadiene having desired properties can be produced.

Rubber Composition for Tire

The rubber composition for tire of the present invention comprises the above polybutadiene (i), another rubber (ii) and a rubber reinforcing material (iii).

As the other rubber component (ii), for example, a diene rubber except the polybutadiene having the above-mentioned properties can be used. Examples of the diene rubber except the polybutadiene having the above-mentioned properties include: polymers of a diene monomer such as polybutadiene rubber which does not have the above-mentioned properties, natural rubber, high-cis polybutadiene rubber, low-cis polybutadiene rubber (BR), syndiotactic-1,2-polybutadiene containing butadiene rubber (VCR), isoprene rubber, butyl rubber, chloroprene rubber and the like; acrylonitrile-diene copolymerization rubbers such as acrylonitrile butadiene rubber (NBR), nitrile chloroprene rubber, nitrile isoprene rubber and the like; styrene-diene copolymerization rubbers such as emulsion polymerized or solution polymerized styrene butadiene rubber (SBR), styrene chloroprene rubber, styrene isoprene rubber and the like; and ethylene propylene diene rubber (EPDM) and the like. Among these, butadiene rubber which does not have the above-mentioned properties, natural rubber, syndiotactic-1, 2-polybutadiene containing butadiene rubber, isoprene rubber, acrylonitrile butadiene rubber and styrene butadiene rubber are preferable. Particularly, solution polymerized styrene butadiene rubber (s-SBR), natural rubber or isoprene rubber is suitable. The other rubber component (ii) may be used alone or may be used in combination with two or more thereof.

The styrene content of the above SBR is preferably not less than 30% by mass, more preferably not less than 35% by mass, further preferably not less than 37% by mass because the effect of the present invention is exerted more sufficiently. On the other hand, the styrene content of SBR is preferably not more than 50% by mass, more preferably not more than 45% by mass, further preferably not more than 42% by mass from the viewpoint of fuel efficiency and abrasion resistance. It is noted that the styrene content of SBR is calculated from a $^1$H-NMR measurement.

The Mooney viscosity ($ML_{1+4,\ 100°\ C.}$) of SBR is preferably 35 to 75, more preferably 37 to 65. If the Mooney viscosity is within the above range, processability, rubber strength, fuel efficiency, abrasion resistance and crack extension resistance can be improved in a good balance.

The preparation method of SBR is not limited particularly and if the above desired properties of SBR is determined, a person skilled in the art can easily prepare the SBR having the above properties.

In the case where the rubber composition comprises SBR, the content thereof in the rubber component is preferably not less than 10% by mass, more preferably not less than 20% by mass, further preferably not less than 30% by mass, particularly preferably not less than 40% by mass, more particularly preferably not less than 50% by mass, most preferably not less than 60% by mass from the viewpoint of rubber strength, fuel efficiency, abrasion resistance and crack extension resistance. On the other hand, the content of SBR is preferably not more than 80% by mass, more preferably not more than 75% by mass from the viewpoint of processability, rubber strength, fuel efficiency and abrasion resistance.

Examples of the rubber reinforcing material (iii) include: inorganic reinforcing materials such as carbon black, white carbon (silica), activated calcium carbonate, ultra-fine particle magnesium silicate and the like; organic reinforcing materials such as polyethylene resin, polypropylene resin, high styrene resin, phenolic resin, lignin, modified melamine resin, coumarone indene resin, petroleum resin and the like. Among these, carbon black or silica is preferable. The rubber reinforcing material may be used alone or may be used in combination with two or more thereof.

The nitrogen adsorption specific surface area ($N_2SA$) of carbon black is normally 5 to 200 $m^2$/g, the lower limit is preferably 50 $m^2$/g and the upper limit is preferably 150 $m^2$/g. The dibutyl phthalate (DBP) adsorption amount of carbon black is normally 5 to 300 ml/100 g, the lower limit is preferably 80 ml/100 g and the upper limit is preferably 180 ml/100 g. If the $N_2SA$ or DBP adsorption amount of carbon black is less than the lower limit of the above range, the reinforcing effect is small and cutting resistance tends to deteriorate. If the $N_2SA$ or DBP adsorption amount of carbon black exceeds the upper limit of the above range, there is a tendency that dispersibility becomes bad, a hysteresis loss increases and fuel efficiency deteriorates. The nitrogen adsorption specific surface area is measured in accordance with ASTM D4820-93 and the DBP adsorption amount is measured in accordance with ASTM D2414-93. Commercially available products such as SEAST 6, SEAST 7HM and SEAST KH (trade name) manufactured by Tokai Carbon Co., Ltd., CK3 and SpecialBlack4A (trade name) manufactured by Degussa GmbH and the like can be used.

In the case where the rubber composition comprises carbon black, the content thereof based on 100 parts by mass of the rubber component is preferably not less than 3 parts by mass, more preferably not less than 10 parts by mass, further preferably not less than 15 parts by mass from the viewpoint of weather resistance and coloring property. On the other hand, the content is preferably not more than 70 parts by mass, more preferably not more than 60 parts by mass, further preferably not more than 50 parts by mass form the viewpoint of fuel efficiency.

The silica is not limited particularly and ones that have been used for a tire component can be used. Among them, in the case where a tire component formed by use of the above rubber composition is a clinch, it is preferable to use fine particle silica having a CTAB specific surface area of not less than 180 $m^2$/g and a BET specific surface area of not less than 185 $m^2$/g because it can provide excellent fuel efficiency and abrasion resistance.

The CTAB (cetyltrimethylammonium bromide) specific surface area of fine particle silica is preferably not less than 190 $m^2$/g, more preferably not less than 195 $m^2$/g, further preferably not less than 197 $m^2$/g from the viewpoint of mechanical strength and abrasion resistance. On the other hand, the CTAB specific surface area of fine particle silica is preferably not more than 600 $m^2$/g, more preferably not more than 300 $m^2$/g, further preferably not more than 250 $m^2$/g from the viewpoint of dispersibility. It is noted that the CTAB specific surface area is measured in accordance with ASTM D3765-92.

The BET specific surface area of fine particle silica is preferably not less than 190 $m^2$/g, more preferably not less than 195 $m^2$/g, further preferably not less than 210 $m^2$/g from the viewpoint of mechanical strength and abrasion resistance. On the other hand, the BET specific surface area of fine particle silica is preferably not more than 600 $m^2$/g, more preferably not more than 300 $m^2$/g, further preferably not more than 260 $m^2$/g from the viewpoint of dispersibility. It is noted that the BET specific surface area is measured in accordance with ASTM D3037-81.

The aggregate size of fine particle silica is not less than 30 nm, preferably not less than 35 nm, more preferably not less than 40 nm, further preferably not less than 45 nm, particularly preferably not less than 50 nm, most preferably not less than 55 nm. On the other hand, the aggregate size of fine particle silica is preferably not more than 100 nm, more preferably not more than 80 nm, further preferably not more than 70 nm, particularly preferably not more than 65 nm. Such aggregate size can provide excellent reinforcing property, fuel efficiency and abrasion resistance while maintaining satisfactory dispersibility.

The aggregate size is referred to as an aggregate diameter or a maximum frequency Stokes equivalent diameter, and means a particle size in the case where a silica aggregate formed by aggregation of a plurality of primary particles is regarded as one particle. The aggregate size may be measured, for example, with a disk centrifugal sedimentation granulometric analysis apparatus such as BI-XDC (produced by Brookhaven Instruments Corporation).

Specifically, the aggregate size may be measured with BI-XDC by the following method. A 50-mL tall beaker is charged with 3.2 g of silica and 40 mL of deionized water to prepare a suspension, and the beaker containing the suspension is placed into a crystallizer filled with ice. In the beaker, the suspension is deagglomerated with an ultrasonic probe (1500 W 1.9 cm VIBRACELL ultrasonic probe (produced by Bioblock, used at 60% of the maximum power output)) for 8 minutes to prepare a sample. Then, 15 mL of the sample is introduced into a disk, stirred, and measured under the conditions of a fixed mode, an analysis time of 120 minutes, and a density of 2.1. In the apparatus recorder, the values of the diameters passing at 16% by mass, 50% by mass (or median) and 84% by mass and the value of the Mode are recorded (the derivative of the cumulative grading curve gives the maximum abscissa known as "Mode" to the distribution curve).

By the disk centrifugal sedimentation granulometric analysis method, a weight average diameter (aggregate size) of the particles (aggregates), marked $D_w$, can be measured after the silica is dispersed in water by ultrasonic deagglomeration. After analysis (sedimentation for 120 minutes), the particle size distribution by weight is calculated by the granulometric analysis apparatus. The weight average diameter of the particles, marked $D_w$, is calculated by the following formula:

$$\log D_w = \sum_1^n m_i \log D_i \bigg/ \sum_1^n m_i$$

wherein $m_i$ is the total mass of the particles in the class of $D_i$.

The average primary particle size of the fine particle silica is preferably not more than 25 nm, more preferably not more than 22 nm, further preferably not more than 17 nm, particularly preferably not more than 14 nm. The lower limit of the average primary particle size is not limited particularly, and is preferably not less than 3 nm, more preferably not less than 5 nm, further preferably not less than 7 nm. In spite of having such a small average primary particle size, the silica has the above-described aggregate size, and therefore has a structure like that of carbon black. Accordingly, dispersibility is more improved, and thereby the reinforcing property, fuel efficiency and abrasion resistance can be further improved. It is noted that the average primary particle size of fine particle silica may be determined by observing the silica with a transmission or scanning electron microscope, measuring the sizes of 400 or more primary particles of the silica observed in the visual field, and averaging the sizes of the 400 or more primary particles.

The D50 of the fine particle silica is preferably not more than 7.0 μm, more preferably not more than 5.5 μm, further preferably not more than 4.5 μm from the viewpoint of dispersibility. On the other hand, the D50 of the fine particle silica is preferably not less than 2.0 μm, more preferably not less than 2.5 μm, further preferably not less than 3.0 μm from the viewpoint of dispersibility. The D50 as used herein is a median diameter of silica than which 50% by mass of the particles are smaller.

The proportion of the fine particle silica whose particle size is larger than 18 μm is preferably not more than 6% by mass, more preferably not more than 4% by mass, further preferably not more than 1.5% by mass from the viewpoint of dispersibility. It is noted that the D50 of fine particle silica and the proportion of silica having a specific particle size are determined by the following method.

The aggregation of aggregates is evaluated by granulometric measurement (by laser diffraction) carried out on a silica suspension previously deagglomerated by ultrasonication. In this method, the aptitude of the silica for deagglomeration is measured (deagglomeration of the silica of 0.1 to tens of μm). The ultrasonic deagglomeration is performed with a VIBRACELL sound wave generator (600 W) manufactured by Bioblock (used at 80% of the maximum power output) equipped with a probe having a diameter of 19 mm. The granulometric measurement is carried out by laser diffraction on a MALVERN Mastersizer 2000 granulometric analyzer.

More specifically, the measurement is carried out by the following method. An amount of 1 g of silica is weighed in a pill box (6 cm in height and 4 cm in diameter), deionized water is added thereto to give a mass of 50 g, and thereby an aqueous suspension including 2% of silica (this suspension is homogenized by magnetic stirring for 2 minutes) is prepared. Subsequently, ultrasonic deagglomeration is performed for 420 seconds, all the homogenized suspension is introduced into the vessel of the granulometric analyzer, and thereafter granulometric measurement is performed.

The pore distribution width W of the pore volume of the fine particle silica is preferably not less than 0.3, more preferably not less than 0.7, further preferably not less than 1.0, particularly preferably not less than 1.3, most preferably not less than 1.5. On the other hand, the pore distribution width W is preferably not more than 5.0, more preferably not more than 4.5, further preferably not more than 4.0, particularly preferably not more than 3.0, most preferably not more than 2.0. Such broad pore distribution leads to an improvement in dispersibility of silica and provides desired performances. It is noted that the pore distribution width W of the pore volume of silica may be measured by the following method.

The pore volume of the fine particle silica is measured by mercury porosimetry. A silica sample is pre-dried in an oven at 200° C. for 2 hours. Subsequently, within five minutes after the sample is removed from the oven, the sample is placed in a test receptacle, and degassed under vacuum. The pore diameter (AUTOPORE III 9420, porosimeter for powder technology) is calculated by Washburn's formula with a contact angle of 140° and a surface tension γ of 484 dynes/cm (or N/m).

The pore distribution width W can be determined from a pore distribution curve shown by the function of pore diameter (nm) and pore volume (ml/g). More specifically, the diameter Xs (nm) that gives the peak value Ys (ml/g) of the pore volume is recorded, the straight line of Y=Ys/2 is drawn, and then the points a and b at which the straight line intersects the pore distribution curve are obtained. When the abscissas (nm) of the points a and b are Xa and Xb (Xa>Xb), respectively, the pore distribution width W is equivalent to (Xa−Xb)/Xs.

The diameter Xs (nm) that gives the peak value Ys of the pore volume in the pore distribution curve of the fine particle silica is preferably not less than 10 nm, more preferably not less than 15 nm, further preferably not less than 18 nm, particularly preferably not less than 20 nm. On the other hand, the diameter Xs is preferably not more than 60 nm, more preferably not more than 35 nm, further preferably not more than 28 nm, particularly preferably not more than 25 nm. If the diameter Xs is within the above range, the fine particle silica which is excellent in dispersibility and reinforcing property can be obtained.

The compounded amount of the fine particle silica is preferably not less than 10 parts by mass, more preferably not less than 15 parts by mass, further preferably not less than 20 parts by mass, particularly preferably not less than 35 parts by mass, most preferably not less than 40 parts by mass based on 100 parts by mass of the rubber component. If the compounded amount is less than 10 parts by mass, sufficient reinforcing property, mechanical strength and abrasion resistance may not be obtained. On the other hand, the compounded amount of the fine particle silica is preferably not more than 150 parts by mass, more preferably not more than 100 parts by mass, further preferably not more than 80 parts by mass, particularly preferably not more than 70 parts by mass. If the compounded amount exceeds 150 parts by mass, processability may deteriorate and it may become difficult to ensure satisfactory dispersibility.

The rubber composition of the present invention may comprise silica other than the above fine particle silica (iii). In this case, the total content of silica is preferably not less than 20 parts by mass, more preferably not less than 30 parts by mass, further preferably not less than 35 parts by mass, most preferably not less than 40 parts by mass based on 100 parts by mass of the rubber component. On the other hand, the total content is preferably not more than 150 parts by mass, more preferably not more than 120 parts by mass, further preferably not more than 100 parts by mass, particularly preferably not more than 80 parts by mass, most preferably not more than 50 parts by mass. If the total content is less than the lower limit or more than the upper limit, there are similar tendencies as those of the above-described fine particle silica.

In the case where the rubber composition comprises silica (fine particle silica and silica other than the fine particle silica) and carbon black, the total content thereof based on 100 parts by mass of the rubber component is preferably not less than 25 parts by mass, more preferably not less than 30 parts by mass, further preferably not less than 35 parts by mass, particularly preferably not less than 40 parts by mass from the viewpoint of reinforcing property. On the other hand, the total content is preferably not more than 150 parts by mass, more preferably not more than 100 parts by mass, further preferably not more than 80 parts by mass, particularly preferably not more than 60 parts by mass, more particularly preferably not more than 55 parts by mass, most preferably not more than 48 parts by mass from the viewpoint of dispersibility and processability.

In the case where a tire component formed by use of the above rubber composition is a base tread, the compounded proportion of the above components is preferably as such that the amount of the rubber reinforcing material (iii) is 1 to 100 parts by mass based on 100 parts by mass of the rubber component (i)+(ii) which consists of 5 to 90 parts by mass of the polybutadiene (i) of the present invention and 95 to 10 parts by mass of the other rubber (ii). The rubber component (i)+(ii) preferably consists of 10 to 60 parts by mass of the polybutadiene (i) and 90 to 40 parts by mass of the other rubber (ii), more preferably consists of 20 to 50 parts by mass of the polybutadiene (i) and 80 to 50 parts by mass of the other rubber (ii). The content of the rubber reinforcing material (iii) based on 100 parts by mass of the rubber component (i)+(ii) is more preferably 30 to 90 parts by mass, further preferably 50 to 80 parts by mass.

In the case where a tire component formed by use of the above rubber composition is a sidewall or a tread (cap tread), the compounded proportion of the above components is preferably as such that the amount of the rubber reinforcing material (iii) is 1 to 130 parts by mass based on 100 parts by mass of the rubber component (i)+(ii) which consists of 5 to 90 parts by mass of the polybutadiene (i) of the present invention and 95 to 10 parts by mass of the other rubber (ii). The rubber component (i)+(ii) preferably consists of 10 to 60 parts by mass of the polybutadiene (i) and 90 to 40 parts by mass of the other rubber (ii), more preferably consists of 20 to 40 parts by mass of the polybutadiene (i) and 80 to 60 parts by mass of the other rubber (ii). The content of the rubber reinforcing material (iii) based on 100 parts by mass of the rubber component (i)+(ii) is more preferably 20 to 80 parts by mass, further preferably 30 to 60 parts by mass.

In the case where a tire component formed by use of the above rubber composition is a clinch, the compounded proportion of the above components is preferably as such that the amount of the rubber reinforcing material (iii) is 1 to 150 parts by weight based on 100 parts by weight of the rubber component (i)+(ii) which consists of 5 to 90 parts by weight of the polybutadiene (i) of the present invention and 95 to 10 parts by weight of the other rubber (ii). The rubber component (i)+(ii) preferably consists of 10 to 60 parts by weight of the polybutadiene (i) and 90 to 40 parts by weight of the other rubber (ii), more preferably consists of 20 to 40 parts by weight of the polybutadiene (i) and 80 to 60 parts by weight of the other rubber (ii). The content of the rubber reinforcing material (iii) based on 100 parts by weight of the rubber component (i)+(ii) is more preferably 30 to 100 parts by weight, further preferably 35 to 60 parts by weight.

The rubber composition according to the present invention can be obtained by kneading the above-mentioned components with a Banbury, an open roll, a kneader, a biaxial kneader and the like, as usually performed.

The rubber composition according to the present invention may be mixed with a compounding agent which is typically used in the rubber industry, such as a silane coupling agent, a vulcanizing agent, a vulcanization accelerator, an anti-aging agent, a filler other than the above carbon black and silica, a process oil, zinc flower, stearic acid and the like as needed.

As the silane coupling agent, a silane coupling agent having a functional group, which can be reacted with the above polybutadiene (i) or the other rubber component (ii), is preferable. The silane coupling agent may be used alone or may be used in combination with two or more thereof.

Any silane coupling agents conventionally used can be used, and examples thereof include: sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-trimethoxysilylpropyl methacrylate monosulfide and the like; mercapto silane coupling agents such as 3-mercaptopropyltrimethoxysilane, 3-mercaptopropyltriethoxysilane, 2-mercaptoethyltrimethoxysilane, 2-mercaptoethyltriethoxysilane and the like; vinyl silane coupling agents such as vinyltriethoxysilane, vinyltrimethoxysilane and the like; amino silane coupling agents such as 3-aminopropyltriethoxysilane, 3-aminopropyltrimethoxysilane, 3-(2-aminoethyl)aminopropyltriethoxysilane, 3-(2-aminoethyl)aminopropyltrimethoxysilane and the like; glycidoxy silane coupling agents such as γ-glycidoxypropyltriethoxysilane, γ-glycidoxypropyltrimethoxysilane, γ-glycidoxypropylmethyldiethoxysilane, γ-glycidoxypropylmethyldimethoxysilane and the like; nitro silane coupling agents such as 3-nitropropyltrimethoxysilane, 3-nitropropyltriethoxysilane and the like; and chloro silane coupling agents such as 3-chloropropyltrimethoxysilane, 3-chloropropyltriethoxysilane, 2-chloroethyltrimethoxysilane, 2-chloroethyltriethoxysilane and the like. Among these, bis(3-triethoxysilylpropyl)tetrasulfide and bis(3-triethoxysilylpropyl)disulfide are preferable since processability is satisfactory. These silane coupling agents may be used alone or may be used in combination with two or more thereof.

The content of the silane coupling agent based on 100 parts by mass of silica is preferably not less than 2 parts by mass, more preferably not less than 4 parts by mass, further preferably not less than 6 parts by mass from the viewpoint of fuel efficiency. If the content is less than 2 parts by mass, the effect of reducing rolling resistance (effect of improving fuel efficiency) may not be obtained sufficiently. On the other hand, the content is preferably not more than 15 parts by mass, more preferably not more than 12 parts by mass, further preferably not more than 10 parts by mass otherwise the effect that is compatible with the content cannot be obtained.

As the vulcanizing agent, a known vulcanizing agent, e.g., sulfur, organic peroxide, resin vulcanizing agent, a metal oxide such as magnesium oxide and the like can be used. The vulcanizing agent may be used alone or may be used in combination with two or more thereof.

As the vulcanization accelerator, a known vulcanization assistant, e.g. aldehydes, ammonias, amines, guanidines, thioureas, thiazoles, thiurams, dithiocarbamates, xanthates and the like can be used. The vulcanization accelerator may be used alone or may be used in combination with two or more thereof.

Examples of the anti-aging agents include amine ketone-type anti-aging agents, imidazole-type anti-aging agents, amine-type anti-aging agents, phenol-type anti-aging agents, sulfur-type anti-aging agents, phosphorus-type anti-aging agents and the like. The anti-aging agents may be used alone or may be used in combination with two or more thereof.

Examples of the filler other than carbon black and silica include: inorganic fillers such as calcium carbonate, basic magnesium carbonate, clay, litharge and diatomaceous earth; and organic fillers such as reproduction rubber and powdery rubber. The filler may be used alone or may be used in combination with two or more thereof.

As the process oil, any of aromatic-type process oil, naphthenic-type process oil and paraffin-type process oil may be used. Also, a low-molecular-weight liquid polybutadiene or a tackifier may be used. The process oil may be used alone or may be used in combination with two or more thereof.

Pneumatic Tire

Since the rubber composition of the present invention is excellent in processability and properties of tire, it can be used for various tire components (tread (one-layer structure), outer surface layer (cap tread) and inner surface layer (base tread) of tread with two-layer structure, side wall, carcass, belt, bead and the like).

The pneumatic tire of the present invention is produced by a usual method using the above rubber composition. That is, the rubber composition comprising the above various compounding agents as necessary is extruded into a shape of respective components of a tire at an unvulcanized state, formed in a tire building machine with other components of tire by a usual method to form an unvulcanized tire. This unvulcanized tire is heated and pressurized in a vulcanizer and the pneumatic tire of the present invention can be produced. It is noted that a tread with a multi-layer structure may be prepared by a method of laminating rubber composition sheets into a predetermined shape, or by a method of introducing a rubber composition into two or more extruders to form a sheet including two or more layers at the head exit of the extruders.

The pneumatic tire of the present invention can be suitably used as tires for passenger vehicle, tires for truck or bus, tires for motorbike, tires for competition and the like and is particularly suitably used as tires for passenger vehicle.

EXAMPLE

Production examples and Examples relating to the present invention will be described specifically in the following. However, the present invention is not limited thereto only.

Production Example 1

To a 1.5 L stainless-steel reactor with a stirrer which had been nitrogen-substituted, 1.0 L of a polymerization solution (butadiene (BD): 35.0% by mass, cyclohexane (CH): 28.0% by mass, and the rest was 2-butenes) was loaded. Further, 1.05 mmol of water ($H_2O$), 1.90 mmol of diethylaluminium chloride (DEAC) (aluminum/water=1.81 (mixed molar ratio)), 20.95 µmol of cobalt octoate (Coat), and 8.06 mmol of cyclooctadiene (COD) were added, and the mixture was stirred at 72° C. for 20 minutes to perform 1,4-cis-polymerization. Then, ethanol containing 4,6-bis(octyl thiomethyl)-o-cresol was added to stop the polymerization. Unreacted butadiene and 2-butenes were evaporated and removed to obtain a polybutadiene.

Then, a rubber composition was produced by using the obtained polybutadiene. Specifically, at first, 30 parts by mass of the polybutadiene and 70 parts by mass of a styrene butadiene rubber (SBR) were mixed for 30 seconds by using a Labo plastmil (manufactured by Toyo Seiki Seisaku-sho, Ltd., trade name: BR-250) in which the temperature and the rotation number were set to be 90° C. and 68 rpm, respectively. Then, 32.5 parts by mass of silica (manufactured by Evonik Degussa Co., Ltd., trade name: Ultrasil 7000GR) which was half quantity of the specified amount and 5.2 parts by mass of a silane coupling agent (manufactured by Evonik Degussa Co., Ltd., trade name: si75) were mixed. Subsequently, 32.5 parts by mass of the rest silica, 25 parts by mass of an oil (manufactured by H&R Group, trade name: VivaTec 400), 3 parts by mass of ZnO (manufactured by Sakai Chemical Industry Co., Ltd., trade name: Sazex 1), 1 part by mass of stearic acid (manufactured by Asahi Denka Co., Ltd., trade name: ADEKA fatty acid SA-300), and 1 part by mass of AO (anti-aging agent, manufactured by OUCHI SHINKO CHEMICAL INDUSTRIAL CO., LTD., trade name: Nocrac 6C) were loaded and the mixture was kneaded for six minutes in total.

Then, after cooling by a 6-inch roll and cooling in air of the obtained kneaded product, the re-mil was performed again. Further, 1.7 parts by mass of a first vulcanization accelerator (manufactured by OUCHI SHINKO CHEMI- CAL INDUSTRIAL CO., LTD., trade name: Nocceler CZ (CBS)), 2 parts by mass of a second vulcanization accelerator (manufactured by OUCHI SHINKO CHEMICAL INDUSTRIAL CO., LTD., trade name: Nocceler D (DPG)), and 1.4 parts by mass of a vulcanizing agent (sulfur powder, manufactured by Tsurumi Chemical Industry Co., Ltd.) were mixed with the kneaded product by a 6-inch roll to produce a compounded substance.

The compounded substance obtained was put in a mold and press-vulcanized to produce a rubber composition. It is noted that the vulcanizing time was 2 times as long as a vulcanizing characteristic t90 at 160° C. which was calculated by a viscoelastic measuring device (manufactured by Alpha Technologies, trade name: RPA2000).

Production Examples 2 to 10

The compounded substances and rubber compositions were prepared in the same manner as in Production example 1 except that the compounding ratio of raw materials and the polymerization temperature were changed to those shown in Table 1. It is noted that in Production examples 2 to 7 and 10, diethylaluminium chloride (DEAC) and triethylaluminum (TEA) were used in combination as an organic aluminum compound.

(5% by Mass Toluene Solution Viscosity (Tcp))

The 5% by mass toluene solution viscosity (Tcp) of polybutadiene was measured by using a Cannon-Fenske viscometer No. 400 at 25° C. after dissolving 2.28 g of polymer in 50 ml of toluene. It is noted that a standard liquid for calibrating viscometers (JIS Z 8809) was used as a standard solution.

(Mooney Viscosity ($ML_{1+4, 100° C.}$))

The Mooney viscosity ($ML_{1+4, 100° C.}$) of polybutadiene and compounded substance was measured at 100° C. in accordance with JIS K 6300. It is noted that regarding the $ML_{1+4, 100° C.}$ of a compounded substance, indexes obtained by assuming the value of Comparative production example 1 to 100 were calculated. (The larger the index is, the smaller the $ML_{1+4, 100° C.}$ of the compounded substance is and the more excellent the processability is.)

(Stress Relaxation Time (T80))

The stress relaxation time (T80) of polybutadiene and compounded substance was calculated by a stress relaxation measurement according to ASTM D1646-7. Specifically, the torque (0 second) at the time when the rotor stopped after measurement for four minutes under the condition for measuring the $ML_{1+4, 100° C.}$ was assumed to be 100%, and the time (unit: second) until the value was relaxed by 80% (i.e. attenuated to 20%) was measured as the stress relaxation times T80.

TABLE 1

| | Production examples | | | | | | | | | |
|---|---|---|---|---|---|---|---|---|---|---|
| | 1 | 2 | 3 | 4 | 5 | 6 | 7 | 8 | 9 | 10 |
| BD concentration [wt %] | 35.0 | 34.2 | 34.2 | 34.2 | 34.2 | 34.2 | 34.2 | 35.0 | 35.0 | 37.0 |
| CH concentration [wt %] | 28.0 | 31.2 | 31.2 | 31.2 | 31.2 | 31.2 | 31.2 | 28.0 | 28.0 | 27.2 |
| $H_2O$ [mmol] | 1.05 | 1.52 | 1.52 | 1.52 | 1.52 | 1.52 | 1.52 | 0.94 | 0.94 | 1.41 |
| DEAC [mmol] | 1.90 | 2.08 | 2.08 | 2.08 | 2.08 | 2.08 | 2.08 | 1.90 | 1.90 | 2.21 |
| TEA [mmol] | — | 0.52 | 0.52 | 0.52 | 0.52 | 0.52 | 0.52 | — | — | 0.20 |
| Al/$H_2O$ | 1.81 | 1.71 | 1.71 | 1.71 | 1.71 | 1.71 | 1.71 | 2.02 | 2.02 | 1.71 |
| $CO_{cat}$ [μmol] | 20.95 | 20.94 | 13.83 | 17.40 | 12.47 | 13.83 | 12.47 | 23.00 | 23.00 | 14.44 |
| COD [mmol] | 8.06 | 6.05 | 8.40 | 5.50 | 7.60 | 4.70 | 5.20 | 7.10 | 6.70 | 7.71 |
| Polymerization temperature [° C.] | 72 | 70 | 70 | 70 | 70 | 70 | 70 | 72 | 72 | 73 |

Comparative Production Example 1

Operations were performed in the same manner as in Production example 1 except that a commercial polybutadiene (manufactured by Ube Industries, Ltd., trade name: BR150L) was used.

Comparative Production Example 2

Operations were performed in the same manner as in Production example 1 except that a trial polybutadiene ((A): Mooney viscosity ($ML_{1+4, 100° C.}$): 67, (B) ratio (Tcp/$ML_{1+4, 100° C.}$) of 5% by mass toluene solution viscosity to Mooney viscosity: 2.9, (C) stress relaxation time (T80): 4.7 seconds, (F) cis-structure in microstructural analysis: 98.1 mol %) was used.

Comparative Production Example 3

Operations were performed in the same manner as in Production example 1 except that a commercial polybutadiene (manufactured by Ube Industries, Ltd., trade name: BR710) was used.

By use of the obtained compounded substances and rubber compositions of Production examples and Comparative production examples, physical properties were measured by the following methods. The results are shown in Table 2.

(Number Average Molecular Weight (Mn), Weight Average Molecular Weight (Mw), Molecular Weight Distribution (Mw/Mn))

The number average molecular weight (Mn), the weight average molecular weight (Mw) and the molecular weight distribution (Mw/Mn) of polybutadiene were calculated by GPC method (manufactured by Tosoh Corporation, trade name: HLC-8220) in terms of standard polystyrene. Tetrahydrofuran was used as a solvent, two serially-connected columns KF-805L of Shodex (trade name) were used, and a differential refractometer (RI) was used as a detector.

(Microstructure)

The microstructure of polybutadiene was calculated by infrared absorption spectrum analysis. Specifically, the microstructure of polymer was calculated from an absorption strength ratio at a peak position (cis: 740 $cm^{-1}$, vinyl: 910 $cm^{-1}$, trans: 967 $cm^{-1}$) derived from the microstructure.

(Abrasion Resistance)

As an index of abrasion resistance of rubber compositions, a Lambourn abrasion coefficient according to JIS K 6264 was measured at a slip rate of 20%, and the indexes obtained by assuming the index of Comparative production example 1 to 100 were calculated (when the index is larger, the Lambourn abrasion coefficient becomes larger and abrasion resistance is improved).

TABLE 2

| | Production examples | | | | | | | | | | Comparative production examples | | |
|---|---|---|---|---|---|---|---|---|---|---|---|---|---|
| | 1 | 2 | 3 | 4 | 5 | 6 | 7 | 8 | 9 | 10 | 1 | 2 | 3 |
| Mooney viscosity (ML$_{1+4, 100° C.}$) | 42 | 50 | 51 | 61 | 63 | 70 | 74 | 50 | 54 | 64 | 42 | 67 | 44 |
| 5% by mass toluene solution viscosity Tcp [cps] | 48 | 70 | 74 | 103 | 117 | 135 | 150 | 51 | 55 | 86 | 101 | 197 | 127 |
| Branching degree Tcp/ML$_{1+4, 100° C.}$ | 1.2 | 1.4 | 1.5 | 1.7 | 1.9 | 1.9 | 2.0 | 1.0 | 1.0 | 1.4 | 2.4 | 2.9 | 2.9 |
| Stress relaxation time T80 [second] | 16.3 | 13.4 | 12.5 | 16.4 | 12.0 | 13.6 | 14.0 | 20.4 | 25.4 | 22.5 | 3.2 | 4.7 | 3.5 |
| Number average molecular weight Mn [×10$^4$] | 15.9 | 17.4 | 18.0 | 19.1 | 19.9 | 20.3 | 21.8 | 16.3 | 16.6 | 18.4 | 21.1 | 25.8 | 18.4 |
| Weight average molecular weight Mw [×10$^4$] | 46.4 | 52.1 | 56.3 | 56.8 | 62.3 | 61.8 | 64.0 | 53.8 | 59.0 | 64.8 | 49.8 | 63.6 | 57.4 |
| Molecular weight distribution Mw/Mn | 2.91 | 2.99 | 3.13 | 2.97 | 3.13 | 3.04 | 2.93 | 3.29 | 3.56 | 3.52 | 2.36 | 2.46 | 3.12 |
| Microstructure cis [mol %] | 97.4 | 97.3 | 97.6 | 97.5 | 97.3 | 97.5 | 97.6 | 96.7 | 96.9 | 97.2 | 98.1 | 98.1 | 97.8 |
| Microstructure vinyl [mol %] | 1.4 | 1.4 | 1.2 | 1.3 | 1.4 | 1.2 | 1.2 | 1.7 | 1.6 | 1.5 | 0.9 | 0.8 | 1.1 |
| Microstructure trans [mol %] | 1.2 | 1.3 | 1.2 | 1.2 | 1.3 | 1.2 | 1.2 | 1.6 | 1.5 | 1.3 | 1.0 | 1.1 | 1.2 |
| Mooney viscosity ML$_{1+4, 100° C.}$ of compounded substance [index] | 106 | 103 | 104 | 98 | 102 | 96 | 95 | 111 | 112 | 104 | 100 | 91 | 107 |
| Lambourn abrasion coefficient of rubber composition [index] | 90 | 103 | 105 | 106 | 107 | 113 | 113 | 92 | 105 | 110 | 100 | 102 | 99 |

Various chemicals used in Examples and Comparative examples will be explained below.
NR: RSS#3 (Tg: −60° C.)
BR1: polybutadiene of Production example 2
BR2: BR150L manufactured by Ube Industries, Ltd.
BR3: BR710 manufactured by Ube Industries, Ltd.
SBR1: Nipol NS116 (solution-polymerized SBR in which a terminal is modified with N-methylpyrrolidone, styrene content: 21% by mass, Tg: −25° C.) manufactured by Zeon Corporation
SBR2: Nipol 1502 (styrene content: 23.5% by mass, Mooney viscosity: 52) manufactured by Zeon Corporation
SBR3: Nipol 1739 (styrene content: 40.0% by mass, Mooney viscosity: 49) manufactured by Zeon Corporation
Silica 1: Ultrasil VN3 (N$_2$SA: 175 m$^2$/g) manufactured by Evonik Degussa Co., Ltd.
Silica 2: Zeosil 1115MP (CTAB specific surface area: 105 m$^2$/g, BET specific surface area: 115 m$^2$/g, average primary particle diameter: 25 nm, aggregate size: 92 nm, pore distribution width W: 0.63, diameter Xs that gives peak value of pore volume in pore distribution curve: 60.3 nm) manufactured by Rhodia Co., Ltd.
Silica 3: Zeosil Premium 200MP (CTAB specific surface area: 200 m$^2$/g, BET specific surface area: 220 m$^2$/g, average primary particle diameter: 10 nm, aggregate size: 65 nm, D50: 4.2 μm, proportion of particle whose particle size is larger than 18 μm: 1.0% by mass, pore distribution width W: 1.57, diameter Xs that gives peak value of pore volume in pore distribution curve: 21.9 nm) manufactured by Rhodia Co., Ltd.
Silica 4: Zeosil HRS 1200MP (CTAB specific surface area: 195 m$^2$/g, BET specific surface area: 200 m$^2$/g, average primary particle diameter: 15 nm, aggregate size: 40 nm, D50: 6.5 μm, proportion of particle whose particle size is larger than 18 μm: 5.0% by mass, pore distribution width W: 0.40, diameter Xs that gives peak value of pore volume in pore distribution curve: 18.8 nm) manufactured by Rhodia Co., Ltd.
Carbon black: DIABLACK E (N550) (N$_2$SA: 41 m$^2$/g) manufactured by Mitsubishi Chemical Corporation
Oil: Diana Process AH-24 (aromatic-type process oil) manufactured by Idemitsu Kosan Co., Ltd.
Silane coupling agent: Si69 (bis(3-triethoxysilylpropyl)tetrasulfide) manufactured by Evonik Degussa Co., Ltd.
Wax: SUNNOC N manufactured by OUCHI SHINKO CHEMICAL INDUSTRIAL CO., LTD.
Anti-aging agent: Ozonon 6C (N-(1,3-dim ethylbutyl)-N'-phenyl-p-phenylenedi amine) manufactured by Seiko Chemical Co., Ltd.
Zinc oxide: zinc oxide manufactured by MITSUI MINING & SMELTING CO., LTD.
Stearic acid: Stearic acid "Tsubaki" manufactured by NOF Corporation
Sulfur: sulfur powder manufactured by Tsurumi Chemical Industry Co., ltd.
Vulcanization accelerator 1: Nocceler NS (N-t-butyl-2-benzothiazolesulfeneamide) manufactured by OUCHI SHINKO CHEMICAL INDUSTRIAL CO., LTD.
Vulcanization accelerator 2: Nocceler CZ (N-cyclohexyl-2-benzothiazolesulfenamide) manufactured by OUCHI SHINKO CHEMICAL INDUSTRIAL CO., LTD.
Vulcanization accelerator 3: Nocceler D (N,N'-diphenylguanidine) manufactured by OUCHI SHINKO CHEMICAL INDUSTRIAL CO., LTD.

Example 1 and Comparative Examples 1 and 2

All of the materials other than sulfur and vulcanization accelerator in compounded amounts as shown in Table 3 were kneaded with a Banbury mixer till the temperature at discharge became about 150° C. for 5 minutes (base kneading step). Then, to the obtained kneaded product were added sulfur and vulcanization accelerator in compounded amounts as shown in Table 3 and the mixture was kneaded with an open roll till the temperature at discharge became 80° C. for about 3 minutes to obtain an unvulcanized rubber composition (finish kneading step). The obtained unvulcanized rubber composition was press-vulcanized at 170° C. for 20 minutes to obtain a vulcanized rubber sheet and a vulcanized rubber test piece.

The above unvulcanized rubber composition was formed into the shape of a base tread, laminated with other components of a tire and vulcanized at 170° C. for 20 minutes to prepare a tire for test.

The following evaluations were conducted using the obtained unvulcanized rubber compositions, vulcanized rubber sheets, vulcanized rubber test pieces and tires for test. The respective test results are shown in Table 3.

Processability (Index of Mooney Viscosity)

With respect to each unvulcanized rubber composition, a Mooney viscosity was measured at 100° C. in accordance with JIS K 6300. The larger the index is, the more excellent the processability is.

Processability (Visual Evaluation)

With respect to each unvulcanized rubber composition, surface smoothness and sheet-end smoothness of a rubber sheet after passing through a roll were visually evaluated. The evaluation was sensory and on a scale of 1 to 5, where 5 indicates satisfactory processability while 1 indicates deteriorated processability. The larger the numerical value is, the more excellent the processability (visual) is.

Index of Silica/Carbon Dispersion

A vulcanized rubber sheet of 2 mm×130 mm×130 mm was produced and a test piece for measurement was cut out therefrom. In accordance with JIS K 6812 "Method for the assessment of the degree of pigment or carbon dispersion in polyolefin pipes, fittings and compounds", the number of aggregates of silica in each test piece was counted, dispersibility (%) was calculated respectively and dispersibility of silica is shown by index, assuming that the dispersibility of Comparative example 1 is 100. The larger index of silica dispersion represents that the silica is well dispersed and dispersibility of silica is excellent.

(Index of silica/carbon dispersion)=(dispersibility of each formulation/dispersibility of Comparative example 1)×100

Index of Fuel Efficiency

A test piece in a specified size was cut out from the obtained vulcanized rubber sheet and a loss tangent (tan δ) of the vulcanized rubber sheet at 60° C. was measured under conditions of an initial strain of 10%, a dynamic strain of 2% and a frequency of 10 Hz using a viscoelastic spectrometer manufactured by Ueshima Seisakusho Co., Ltd. Assuming that the tan δ of Comparative example 1 is 100, the results are shown by index (index of fuel efficiency) according to the following formula. The larger the index is, the more excellent the fuel efficiency is.

(Index of fuel efficiency)=(tan δ of Comparative example 1)/(tan δ of each formulation)×100

Index of Breaking Energy

In accordance with JIS K 6251 "Rubber, vulcanized or thermoplastic—Determination of tensile properties", tensile strength and elongation at break of each vulcanized rubber sheet were measured. Further, breaking energy was calculated by the formula: tensile strength×elongation at break/2 and index of breaking energy was calculated by the following formula. The larger the index of breaking energy is, the more excellent the mechanical strength is.

(Index of breaking energy)=(breaking energy of each formulation)/(breaking energy of Comparative example 1)×100

Steering Stability

The tires for test were loaded on the whole wheels of a vehicle (domestically produced FF, 2000 cc), followed by a test running on a test course on a real vehicle. Steering stability was evaluated by a sensorial evaluation of a driver. At that time, relative evaluation with respect to each other was performed on a scale of 1 to 10, assuming that the steering stability of Comparative example 1 was 6. The larger the value is, the more excellent the steering stability is.

TABLE 3

|  | Comparative examples | | Example |
| --- | --- | --- | --- |
|  | 1 | 2 | 1 |
| Compounded amount (part by mass) | | | |
| NR | 50 | 50 | 50 |
| BR1 | — | — | 50 |
| BR2 | 50 | — | — |
| BR3 | — | 50 | — |
| Silica 1 | 30 | 30 | 30 |
| Carbon black | 30 | 30 | 30 |
| Oil | 10 | 10 | 10 |
| Silane coupling agent | 2.4 | 2.4 | 2.4 |
| Wax | 2 | 2 | 2 |
| Anti-aging agent | 2 | 2 | 2 |
| Zinc oxide | 2 | 2 | 2 |
| Stearic acid | 2 | 2 | 2 |
| Sulfur | 2 | 2 | 2 |
| Vulcanization accelerator 1 | 2 | 2 | 2 |
| Evaluation results | | | |
| Index of Mooney viscosity | 100 | 95 | 107 |
| Processability (visual evaluation) | 3 | 2 | 5 |
| Index of silica/carbon dispersion | 100 | 97 | 101 |
| Index of fuel efficiency | 100 | 98 | 102 |
| Index of breaking energy | 100 | 99 | 102 |
| Steering stability | 6.00 | 6.25 | 6.75 |

From Table 3, it can be found that a pneumatic tire having a base tread component prepared by use of the rubber composition according to the present invention, which comprises a specified polybutadiene and is excellent in processability and fuel efficiency, is excellent in fuel efficiency and steering stability.

Example 2 and Comparative Examples 3 and 4

All of the materials other than sulfur and vulcanization accelerator in compounded amounts as shown in Table 4 were kneaded with a Banbury mixer till the temperature at discharge became about 150° C. for 5 minutes (base kneading step). Then, to the kneaded product were added sulfur and vulcanization accelerator in compounded amounts as shown in Table 4 and the mixture was kneaded with an open roll till the temperature at discharge became 80° C. for about 3 minutes to obtain an unvulcanized rubber composition (finish kneading step). The obtained unvulcanized rubber composition was press-vulcanized at 170° C. for 20 minutes to obtain a vulcanized rubber sheet and a vulcanized rubber test piece.

The above unvulcanized rubber composition was formed into the shape of a sidewall, laminated with other components of a tire and vulcanized at 170° C. for 20 minutes to prepare a tire for test.

The following evaluations were conducted using the obtained unvulcanized rubber compositions, vulcanized rubber sheets, vulcanized rubber test pieces and tires for test. The respective test results are shown in Table 4.

Processability (Index of Mooney Viscosity)

With respect to each unvulcanized rubber composition, a Mooney viscosity was measured at 100° C. in accordance with JIS K 6300. The larger the index is, the more excellent the processability is.

Processability (Visual Evaluation)

With respect to each unvulcanized rubber composition, surface smoothness and sheet-end smoothness of a rubber sheet after passing through a roll were visually evaluated. The evaluation was sensory and on a scale of 1 to 5, where 5 indicates satisfactory processability while 1 indicates deteriorated processability. The larger the numerical value is, the more excellent the processability (visual) is.

Index of Fuel Efficiency

A test piece in a specified size was cut out from the obtained vulcanized rubber sheet and a loss tangent (tan δ) of each vulcanized rubber sheet at 60° C. was measured under conditions of an initial strain of 10%, a dynamic strain of 2% and a frequency of 10 Hz using a viscoelastic spectrometer manufactured by Ueshima Seisakusho Co., Ltd. Assuming that the tan δ of Comparative example 3 is 100, the results are shown by index (index of fuel efficiency) according to the following formula. The larger the index is, the more excellent the fuel efficiency is.

(Index of fuel efficiency)=(tan δ of Comparative example 3)/(tan δ of each formulation)×100

Tear Test

In accordance with JIS K 6252 "Rubber, vulcanized or thermoplastic—Determination of tear strength", tear strength (N/mm) was determined by used of an unnicked angle-shaped test piece (vulcanized rubber sheet) and an index of tear strength is calculated by the following formula, assuming that the tear strength of Comparative example 3 is 100. The larger the index of tear strength is, the larger the tear strength is and the more excellent the durability is.

(Index of tear strength)=(tear strength of each formulation)/(tear strength of Comparative example 3)×100

De Mattia Flex Crack Growth Test

In accordance with JIS K6260 "Rubber, vulcanized or thermoplastic—Determination method of De Mattia flex crack growth", each vulcanized rubber sheet was tested under conditions of a temperature of 23° C. and a relative humidity of 55% to determine the crack length after one million test cycles or the number of test cycles until a crack grew to 1 mm. Based on the determined number and the crack length, the number of flexing cycles until a crack grew to 1 mm on the sample was expressed as the common logarithm, which is then shown by index below assuming that the common logarithm of Comparative example 3 is 100. The percentages 70% and 110% each indicate an elongation rate relative to the original length of the sample of the vulcanized rubber test piece sample. The larger the index of the common logarithm is, the less likely the crack grows and the more excellent the flex crack growth resistance is and the more excellent the durability is.

(Index of flex crack growth (70%, 110%))=(common logarithm of number of flexing cycles until crack grew to 1 mm, determined in each formulation)/(the common logarithm of number of flexing cycles until crack grew to 1 mm, determined in Comparative example 3)×100

Index of Breaking Energy

In accordance with JIS K 6251 "Rubber, vulcanized or thermoplastic—Determination of tensile properties", tensile strength and elongation at break of each vulcanized rubber sheet were measured. Further, breaking energy was calculated by the formula: tensile strength×elongation at break/2 and index of breaking energy was calculated by the following formula. The larger the index of breaking energy is, the more excellent the mechanical strength and the breaking resistance are.

(Index of breaking energy)=(breaking energy of each formulation)/(breaking energy of Comparative example 3)×100

Steering Stability

The tires for test were loaded on the whole wheels of a vehicle (domestically produced FF, 2000 cc), followed by a test running on a test course on a real vehicle. Steering stability was evaluated by a sensorial evaluation of a driver. At that time, relative evaluation with respect to each other was performed on a scale of 1 to 10, assuming that the steering stability of Comparative example 3 was 6. The larger the index is, the more excellent the steering stability is.

TABLE 4

|  | Comparative examples | | Example |
|---|---|---|---|
|  | 3 | 4 | 2 |
| Compounded amount (part by mass) | | | |
| NR | 40 | 40 | 40 |
| BR1 | — | — | 60 |
| BR2 | 60 | — | — |
| BR3 | — | 60 | — |
| Carbon black | 50 | 50 | 50 |
| Oil | 5 | 5 | 5 |
| Wax | 1.5 | 1.5 | 1.5 |
| Anti-aging agent | 3 | 3 | 3 |
| Zinc oxide | 3 | 3 | 3 |
| Stearic acid | 2 | 2 | 2 |
| Sulfur | 1.6 | 1.6 | 1.6 |
| Vulcanization accelerator 1 | 1 | 1 | 1 |
| Evaluation results | | | |
| Index of Mooney viscosity | 100 | 98 | 103 |
| Processability (visual evaluation) | 3 | 2 | 4 |
| Index of fuel efficiency | 100 | 98 | 102 |
| Index of tear strength | 100 | 101 | 102 |
| Index of flex crack growth (70° C.) | 100 | 101 | 102 |
| Index of flex crack growth (100° C.) | 100 | 101 | 104 |
| Index of breaking energy | 100 | 105 | 110 |
| Steering stability | 6.00 | 6.25 | 6.75 |

From Table 4, it can be found that a pneumatic tire having a sidewall component prepared by use of the rubber composition according to the present invention, which comprises a specified polybutadiene and is excellent in processability, durability and breaking resistance, is excellent in durability, breaking resistance and steering stability.

Example 3 and Comparative Examples 5 and 6

All of the materials other than sulfur and vulcanization accelerator in compounded amounts as shown in Table 5 were kneaded with a Banbury mixer till the temperature at discharge became about 150° C. for 5 minutes (base kneading step). Then, to the kneaded product were added sulfur and vulcanization accelerator in compounded amounts as shown in Table 5 and the mixture was kneaded with an open roll till the temperature at discharge became 80° C. for about 3 minutes to obtain an unvulcanized rubber composition (finish kneading step). The obtained unvulcanized rubber composition was press-vulcanized at 170° C. for 20 minutes to obtain a vulcanized rubber sheet and a vulcanized rubber test piece.

The above unvulcanized rubber composition was formed into the shape of a tread (one-layer structure), laminated with other components of a tire and vulcanized at 170° C. for 20 minutes to prepare a tire for test.

The following evaluations were conducted using the obtained unvulcanized rubber compositions, vulcanized rubber sheets, vulcanized rubber test pieces and tires for test. The respective test results are shown in Table 5.

Processability (Index of Mooney Viscosity)

With respect to each unvulcanized rubber composition, a Mooney viscosity was measured at 100° C. in accordance with JIS K 6300. The larger the index is, the more excellent the processability is.

Processability (Visual Evaluation)

With respect to each unvulcanized rubber composition, surface smoothness and sheet-end smoothness of a rubber sheet after passing through a roll were visually evaluated. The evaluation was sensory and on a scale of 1 to 5, where 5 indicates satisfactory processability while 1 indicates deteriorated processability. The larger the numerical value is, the more excellent the processability (visual) is.

Index of Silica Dispersion

A vulcanized rubber sheet of 2 mm×130 mm×130 mm was produced and a test piece for measurement was cut out therefrom. In accordance with JIS K 6812 "Method for the assessment of the degree of pigment or carbon dispersion in polyolefin pipes, fittings and compounds", the number of aggregates of silica in each test piece was counted, dispersibility (%) was calculated respectively and dispersibility of silica is shown by index, assuming that the dispersibility of Comparative example 5 is 100. The larger index of silica dispersion represents that the silica is well dispersed and dispersibility of silica is more excellent.

(Index of silica dispersion)=(dispersibility of each formulation/dispersibility of Comparative example 5)×100

Index of Fuel Efficiency

A test piece in a specified size was cut out from the obtained vulcanized rubber sheet and a loss tangent (tan δ) of each vulcanized rubber sheet at 60° C. was measured under conditions of an initial strain of 10%, a dynamic strain of 2% and a frequency of 10 Hz using a viscoelastic spectrometer manufactured by Ueshima Seisakusho Co., Ltd. Assuming that the tan δ of Comparative example 5 is 100, the results are shown by index (index of fuel efficiency) according to the following formula. The larger the index is, the more excellent the fuel efficiency is.

(Index of fuel efficiency)=(tan δ of Comparative example 5)/(tan δ of each formulation)×100

Wet Grip Performance

Based on braking performance determined by an anti-lock braking system (ABS) evaluation test, grip performance was evaluated. That is, the tires for test were loaded on a vehicle equipped with a 1800 cc class ABS, followed by running on an asphalt road surface (wet road condition, skid number: about 50) on a real vehicle. The brake was applied at a speed of 100 km/h and deceleration speed until the vehicle stopped was calculated. Here, the deceleration speed is a distance until which the vehicle stopped. The deceleration speed of each formulation is shown as an index of wet grip performance by the following formula, assuming that the index of wet grip performance of Comparative example 5 is 100. The larger the index of wet grip performance is, the more satisfactory the braking performance is and the more excellent the wet grip performance is.

(Index of wet grip performance)=(deceleration speed of Comparative example 5)/(deceleration speed of each formulation)×100

Abrasion Resistance Test (Abrasion Test)

The produced tires for test were loaded on a vehicle, followed by running around town for 8000 km. The reduced amount of depth of a groove after running was measured and the running distance at which the depth of a groove was reduced for 1 mm was calculated. The reduced amount of groove depth of each formulation is shown with index by the following formula, assuming that the index of abrasion resistance of Comparative example 5 is 100. The larger the index is, the more excellent the abrasion resistance is.

(Index of abrasion resistance)=(Running distance at which the depth of a groove of each formulation was reduced for 1 mm)/(running distance at which the depth of a groove of Comparative example 5 was reduced for 1 mm)×100

TABLE 5

|  | Comparative examples | | Example |
| --- | --- | --- | --- |
|  | 5 | 6 | 3 |
| Compounded amount (part by mass) | | | |
| SBR1 | 80 | 80 | 80 |
| BR1 | — | — | 20 |
| BR2 | 20 | — | — |
| BR3 | — | 20 | — |
| Silica 1 | 80 | 80 | 80 |
| Carbon black | 5 | 5 | 5 |
| Oil | 15 | 15 | 15 |
| Silane coupling agent | 6.4 | 6.4 | 6.4 |
| Wax | 2 | 2 | 2 |
| Anti-aging agent | 2 | 2 | 2 |
| Zinc oxide | 2.5 | 2.5 | 2.5 |
| Stearic acid | 2 | 2 | 2 |
| Sulfur | 2 | 2 | 2 |
| Vulcanization accelerator 1 | 4 | 4 | 4 |
| Evaluation results | | | |
| Index of Mooney viscosity | 100 | 95 | 105 |
| Processability (visual evaluation) | 3 | 1 | 5 |
| Index of silica dispersion | 100 | 98 | 102 |
| Index of fuel efficiency | 100 | 98 | 102 |
| Index of wet grip | 100 | 98 | 103 |
| Index of abrasion resistance | 100 | 102 | 105 |

From Table 5, it can be found that a pneumatic tire having a tread component prepared by use of the rubber composition according to the present invention, which comprises a specified polybutadiene and is excellent in processability and abrasion resistance, is excellent in abrasion resistance.

Examples 4 and 5 and Comparative Examples 7 to 10

All of the materials other than sulfur and vulcanization accelerator in compounded amounts as shown in Table 6 were kneaded with a Banbury mixer till the temperature at discharge became about 150° C. for 5 minutes (base kneading step). Then, to the kneaded product were added sulfur and vulcanization accelerator in compounded amounts as shown in Table 6 and the mixture was kneaded with an open roll till the temperature at discharge became 80° C. for about 3 minutes to obtain an unvulcanized rubber composition (finish kneading step). The obtained unvulcanized rubber composition was press-vulcanized at 170° C. for 20 minutes to obtain a vulcanized rubber sheet and a vulcanized rubber test piece.

The above unvulcanized rubber composition was formed into the shape of a tread (one-layer structure), laminated with other components of a tire and vulcanized at 170° C. for 15 minutes to prepare a tire for test.

The following evaluations were conducted using the obtained unvulcanized rubber compositions, vulcanized rubber sheets, vulcanized rubber test pieces and tires for test. The respective test results are shown in Table 6.

Processability (Index of Mooney Viscosity)

With respect to each unvulcanized rubber composition, a Mooney viscosity was measured at 100° C. in accordance with JIS K 6300. The larger the index is, the more excellent the processability is.

Processability (Visual Evaluation)

With respect to each unvulcanized rubber composition, surface smoothness and sheet-end smoothness of a rubber sheet after passing through a roll were visually evaluated. The evaluation was sensory and on a scale of 1 to 5, where 5 indicates satisfactory processability while 1 indicates deteriorated processability. The larger the numerical value is, the more excellent the processability (visual) is.

Index of Silica Dispersion

A vulcanized rubber sheet of 2 mm×130 mm×130 mm was produced and a test piece for measurement was cut out therefrom. In accordance with JIS K 6812 "Method for the assessment of the degree of pigment or carbon dispersion in polyolefin pipes, fittings and compounds", the number of aggregates of silica in each test piece was counted, dispersibility (%) was calculated respectively and dispersibility of silica is shown by index, assuming that the dispersibility of Comparative example 7 is 100. The larger index of silica dispersion represents that the silica is well dispersed and dispersibility of silica is more excellent.

(Index of silica dispersion)=(dispersibility of each formulation/dispersibility of Comparative example 7)×100

Index of Fuel Efficiency

A test piece in a specified size was cut out from the obtained vulcanized rubber sheet and a loss tangent (tan δ) of vulcanized rubber sheet at 60° C. was measured under conditions of an initial strain of 10%, a dynamic strain of 2% and a frequency of 10 Hz using a viscoelastic spectrometer manufactured by Ueshima Seisakusho Co., Ltd. Assuming that the tan δ of Comparative example 7 is 100, the results are shown by index (index of fuel efficiency) according to the following formula. The larger the index is, the more excellent the fuel efficiency is.

(Index of fuel efficiency)=(tan δ of Comparative example 7)/(tan δ of each formulation)×100

Wet Grip Performance

Based on braking performance as determined by an anti-lock braking system (ABS) evaluation test, grip performance was evaluated. That is, the tires for test were loaded on a vehicle equipped with a 1800 cc class ABS, followed by running on an asphalt road surface (wet road condition, skid number: about 50) on a real vehicle. The brake was applied at a speed of 100 km/h and deceleration speed until the vehicle stopped was calculated. Here, the deceleration speed is a distance until which the vehicle stopped. The deceleration speed of each formulation is shown as an index of wet grip performance by the following formula, assuming that the index of wet grip performance of Comparative example 7 is 100. The larger the index of wet grip performance is, the more satisfactory the braking performance is and the more excellent the wet grip performance is.

(Index of wet grip performance)=(deceleration speed of Comparative example 7)/(deceleration speed of each formulation)×100

Abrasion Resistance Test (Abrasion Test)

The produced tires for test were loaded on a vehicle, followed by running around town for 8000 km. The reduced amount of depth of a groove after running was measured and the running distance at which the depth of a groove was reduced for 1 mm was calculated. The reduced amount of groove depth of each formulation is shown with index by the following formula, assuming that the index of abrasion resistance of Comparative example 7 is 100. The larger the index is, the more excellent the abrasion resistance is.

(Index of abrasion resistance)=(Running distance at which the depth of a groove of each formulation was reduced for 1 mm)/(running distance at which the depth of a groove of Comparative example 7 was reduced for 1 mm)×100

TABLE 6

|  | Comparative examples | | | | Examples | |
| --- | --- | --- | --- | --- | --- | --- |
|  | 7 | 8 | 9 | 10 | 4 | 5 |
| Compounded amount (part by mass) | | | | | | |
| SBR2 | 80 | 80 | — | — | 80 | — |
| SBR3 | — | — | 80 | 80 | — | 80 |
| BR1 | — | — | — | — | 20 | 20 |
| BR2 | 20 | — | 20 | — | — | — |
| BR3 | — | 20 | — | 20 | — | — |
| Silica 1 | 80 | 80 | 80 | 80 | 80 | 80 |
| Carbon black | 5 | 5 | 5 | 5 | 5 | 5 |
| Oil | 15 | 15 | 15 | 15 | 15 | 15 |
| Silane coupling agent | 6.4 | 6.4 | 6.4 | 6.4 | 6.4 | 6.4 |
| Wax | 2 | 2 | 2 | 2 | 2 | 2 |
| Anti-aging agent | 2 | 2 | 2 | 2 | 2 | 2 |
| Zinc oxide | 2.5 | 2.5 | 2.5 | 2.5 | 2.5 | 2.5 |
| Stearic acid | 2 | 2 | 2 | 2 | 2 | 2 |
| Sulfur | 2 | 2 | 2 | 2 | 2 | 2 |
| Vulcanization accelerator 1 | 4 | 4 | 4 | 4 | 4 | 4 |
| Evaluation results | | | | | | |
| Index of Mooney viscosity | 100 | 96 | 98 | 95 | 103 | 106 |
| Processability (visual evaluation) | 3 | 2 | 2 | 1 | 4 | 5 |
| Index of silica dispersion | 100 | 98 | 100 | 97 | 102 | 103 |
| Index of fuel efficiency | 100 | 98 | 99 | 96 | 102 | 104 |
| Index of wet grip | 100 | 98 | 99 | 99 | 102 | 102 |
| Index of abrasion resistance | 100 | 101 | 100 | 100 | 104 | 105 |

From Table 6, it can be found that a pneumatic tire having a tread component prepared by use of the rubber composition according to the present invention, which comprises a specified polybutadiene and is excellent in processability and abrasion resistance, is excellent in abrasion resistance.

Examples 6 to 9 and Comparative Examples 11 to 18

All of the materials other than sulfur and vulcanization accelerators in compounded amounts as shown in Table 7 were kneaded with a Banbury mixer till the temperature at discharge became about 150° C. for 5 minutes (base kneading step). Then, to the kneaded product were added sulfur and vulcanization accelerators in compounded amounts as shown in Table 7 and the mixture was kneaded with an open roll till the temperature at discharge became 80° C. for about 3 minutes to obtain an unvulcanized rubber composition (finish kneading step). The obtained unvulcanized rubber composition was press-vulcanized at 170° C. for 20 minutes to obtain a vulcanized rubber sheet and a vulcanized rubber test piece.

The above unvulcanized rubber composition was formed into the shape of a clinch, laminated with other components of a tire and vulcanized at 170° C. for 15 minutes to prepare a tire for test.

The following evaluations were conducted using the obtained unvulcanized rubber compositions, vulcanized rubber sheets, vulcanized rubber test pieces and tires for test. The respective test results are shown in Table 7.

Processability (Index of Mooney Viscosity)

With respect to each unvulcanized rubber composition, a Mooney viscosity was measured at 100° C. in accordance with JIS K 6300. The larger the index is, the more excellent the processability is.

Processability (Visual Evaluation)

With respect to each unvulcanized rubber composition, surface smoothness and sheet-end smoothness of a rubber sheet after passing through a roll were visually evaluated. The evaluation was sensory and on a scale of 1 to 5, where 5 indicates satisfactory processability while 1 indicates deteriorated processability. The larger the numerical value is, the more excellent the processability (visual) is.

Index of Breaking Energy

In accordance with JIS K 6251 "Rubber, vulcanized or thermoplastic—Determination of tensile properties", tensile strength and elongation at break of each vulcanized rubber sheet were measured. Further, breaking energy was calculated by the formula: tensile strength×elongation at break/2 and an index of breaking energy was calculated by the following formula. The larger the index of breaking energy is, the more excellent the mechanical strength and the breaking strength are.

(Index of breaking energy)=(breaking energy of each formulation)/(breaking energy of Comparative example 11)×100

Index of Fuel Efficiency

A test piece in a specified size was cut out from the obtained vulcanized rubber sheet and a loss tangent (tan δ) of vulcanized rubber sheets at 60° C. was measured under conditions of an initial strain of 10%, a dynamic strain of 2% and a frequency of 10 Hz using a viscoelastic spectrometer manufactured by Ueshima Seisakusho Co., Ltd. Assuming that the tan δ of Comparative example 11 is 100, the results are shown by index (index of fuel efficiency) according to the following formula. The larger the index is, the more excellent the fuel efficiency is.

(Index of fuel efficiency)=(tan δ of Comparative example 11)/(tan δ of each formulation)×100

Abrasion Resistance Test (Abrasion Test)

The produced tires for test were loaded on a vehicle, followed by running around town for 8000 km. The reduced amount of depth of a groove after running was measured and the running distance at which the depth of a groove was reduced for 1 mm was calculated. The reduced amount of groove depth of each formulation is shown with index by the following formula, assuming that the index of abrasion resistance of Comparative example 11 is 100. The larger the index is, the more excellent the abrasion resistance is.

(Index of abrasion resistance)=(Running distance at which the depth of a groove of each formulation was reduced for 1 mm)/(running distance at which the depth of a groove of Comparative example 11 was reduced for 1 mm)×100

Steering Stability

The tires for test were loaded on the whole wheels of a vehicle (domestically produced FF, 2000 cc), followed by a test running on a test course on a real vehicle. Steering stability was evaluated by a sensorial evaluation of a driver. At that time, relative evaluation with respect to each other was performed on a scale of 1 to 10, assuming that the steering stability of Comparative example 11 was 6. The larger the index is, the more excellent the steering stability is.

TABLE 7

| | Comparative examples | | | | | | | | Examples | | | |
|---|---|---|---|---|---|---|---|---|---|---|---|---|
| | 11 | 12 | 13 | 14 | 15 | 16 | 17 | 18 | 6 | 7 | 8 | 9 |
| Compounded amount (part by mass) | | | | | | | | | | | | |
| NR | 60 | 60 | 60 | 60 | 60 | 60 | 60 | 60 | 60 | 60 | 60 | 60 |
| BR1 | — | — | — | — | — | — | — | 40 | 40 | 40 | 40 | 40 |
| BR2 | 40 | 40 | 40 | 40 | — | — | — | — | — | — | — | — |
| BR3 | — | — | — | — | 40 | 40 | 40 | — | — | — | — | — |
| Carbon black | 50 | 40 | 25 | — | 50 | 25 | — | 25 | — | — | 25 | 25 |
| Silica 2 | — | — | 25 | 50 | — | 25 | 50 | 25 | — | — | — | — |
| Silica 3 | — | — | — | — | — | — | — | — | 50 | — | 25 | — |
| Silica 4 | — | — | — | — | — | — | — | — | — | 50 | — | 25 |
| Silane coupling agent | — | — | 2 | 4 | — | 2 | 4 | 2 | 4 | 4 | 2 | 2 |
| Oil | 6 | 6 | 6 | 6 | 6 | 6 | 6 | 6 | 6 | 6 | 6 | 6 |
| Wax | 2 | 2 | 2 | 2 | 2 | 2 | 2 | 2 | 2 | 2 | 2 | 2 |
| Anti-aging agent | 2.5 | 2.5 | 2.5 | 2.5 | 2.5 | 2.5 | 2.5 | 2.5 | 2.5 | 2.5 | 2.5 | 2.5 |
| Zinc oxide | 3 | 3 | 3 | 3 | 3 | 3 | 3 | 3 | 3 | 3 | 3 | 3 |
| Stearic acid | 2 | 2 | 2 | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 | 1.5 | 1.5 | 1.5 |
| Vulcanization accelerator 2 | 0.7 | 0.7 | 0.7 | 0.7 | 0.7 | 0.7 | 0.7 | 0.7 | 0.7 | 0.7 | 0.7 | 0.7 |
| Vulcanization accelerator 3 | 0.6 | 0.6 | 0.6 | 0.6 | 0.6 | 0.6 | 0.6 | 0.6 | 0.6 | 0.6 | 0.6 | 0.6 |

TABLE 7-continued

|  | Comparative examples | | | | | | | | Examples | | | |
|---|---|---|---|---|---|---|---|---|---|---|---|---|
|  | 11 | 12 | 13 | 14 | 15 | 16 | 17 | 18 | 6 | 7 | 8 | 9 |
| Evaluation results | | | | | | | | | | | | |
| Index of Mooney viscosity | 100 | 105 | 100 | 101 | 96 | 96 | 97 | 105 | 102 | 105 | 103 | 106 |
| Processability (visual evaluation) | 3 | 4 | 3 | 3 | 2 | 3 | 2 | 3 | 5 | 5 | 5 | 5 |
| Index of breaking energy | 100 | 85 | 110 | 115 | 105 | 112 | 115 | 110 | 105 | 104 | 115 | 113 |
| Index of fuel efficiency | 100 | 108 | 102 | 103 | 98 | 100 | 102 | 101 | 102 | 101 | 103 | 102 |
| Index of abrasion resistance | 100 | 95 | 98 | 98 | 102 | 99 | 98 | 98 | 106 | 104 | 106 | 105 |
| Steering stability | 6 | 5.75 | 6 | 5.75 | 6.25 | 6 | 5.75 | 6 | 6.75 | 6.5 | 6.75 | 6.5 |

From Table 7, it can be found that a pneumatic tire having a clinch component prepared by use of the rubber composition according to the present invention, which comprises a specified polybutadiene and is excellent in processability, breaking resistance and abrasion resistance, is excellent in fuel efficiency, abrasion resistance, breaking resistance and steering stability.

The invention claimed is:

1. A pneumatic tire having a tire component prepared by use of a rubber composition comprising:
   a polybutadiene (i) which satisfies conditions of:
   (A) a Mooney viscosity ($ML_{1+4,\ 100°\ C.}$) of 48 to 70,
   (B) a ratio ($Tcp/ML_{1+4,\ 100°\ C.}$) of 5% by mass toluene solution viscosity (Tcp) to Mooney viscosity ($ML_{1+4,\ 100°\ C.}$) of 0.9 to 1.7,
   (C) a stress relaxation time (T80), being a time until a torque is attenuated by 80% assuming that the torque at the end of $ML_{1+4,\ 100°\ C.}$ measurement is 100%, of 10.0 to 40.0 seconds,
   (D) a molecular weight distribution (Mw/Mn) of 2.50 to 4.00, and
   (F) a proportion of cis-structure in microstructural analysis of not more than 98 mol %;
   another rubber (ii); and
   a rubber reinforcing material (iii).

2. The pneumatic tire of claim 1, wherein the polybutadiene (i) further satisfies a condition of:
   (E) a weight average molecular weight (Mw) of $40.0 \times 10^4$ to $75.0 \times 10^4$.

3. The pneumatic tire of claim 1, wherein the polybutadiene (i) is produced by using a cobalt catalyst.

4. The pneumatic tire of claim 1, wherein the other rubber (ii) comprises a natural rubber or an isoprene rubber.

5. The pneumatic tire of claim 1, wherein the other rubber (ii) comprises a styrene-butadiene rubber.

6. The pneumatic tire of claim 5, wherein a styrene content of the styrene-butadiene rubber is not less than 30% by mass.

7. The pneumatic tire of claim 1, wherein the tire component is a base tread component.

8. The pneumatic tire of claim 7, wherein a content of the rubber reinforcing material (iii) is 1 to 100 parts by mass based on 100 parts by mass of the rubber component (i)+(ii) which consists of 5 to 90 parts by mass of the polybutadiene (i) and 95 to 10 parts by mass of the other rubber (ii).

9. The pneumatic tire of claim 1, wherein the tire component is a sidewall component.

10. The pneumatic tire of claim 1, wherein the tire component is a tread component.

11. The pneumatic tire of claim 9, wherein a content of the rubber reinforcing material (iii) is 1 to 130 parts by mass based on 100 parts by mass of the rubber component (i)+(ii) which consists of 5 to 90 parts by mass of the polybutadiene (i) and 95 to 10 parts by mass of the other rubber (ii).

12. The pneumatic tire of claim 1, wherein the tire component is a clinch and the rubber reinforcing material (iii) comprises silica having a CTAB specific surface area of not less than 180 $m^2/g$ and a BET specific surface area of not less than 185 $m^2/g$.

13. The pneumatic tire of claim 12, wherein a content of the silica is 1 to 150 parts by mass based on 100 parts by mass of the rubber component (i)+(ii) which consists of 5 to 90 parts by mass of the polybutadiene (i) and 95 to 10 parts by mass of the other rubber (ii).

14. The pneumatic tire of claim 10, wherein a content of the rubber reinforcing material (iii) is 1 to 130 parts by mass based on 100 parts by mass of the rubber component (i)+(ii) which consists of 5 to 90 parts by mass of the polybutadiene (i) and 95 to 10 parts by mass of the other rubber (ii).

\* \* \* \* \*